United States Patent [19]

Chaudhary

[11] 4,007,465
[45] Feb. 8, 1977

[54] SYSTEM FOR SELF-CLEANING INK JET HEAD

[75] Inventor: Kailash Chandra Chaudhary, Los Angeles, Calif.

[73] Assignee: International Business Machines Corporation, Armonk, N.Y.

[22] Filed: Nov. 17, 1975

[21] Appl. No.: 632,534

[52] U.S. Cl. .......................................... 346/140 R
[51] Int. Cl.² ...................................... G01D 15/18
[58] Field of Search .............................. 346/140, 75

[56] References Cited

UNITED STATES PATENTS

| 3,900,162 | 8/1975 | Titus et al. | 346/75 X |
| 3,974,508 | 8/1976 | Blumenthal | 346/140 R |

OTHER PUBLICATIONS

Brady, et al., Fluid Circuit for Fast Startup of an Ink Jet Head, IBM Tech. Disc. Bulletin, vol. 17, No. 5, Oct. 1974, p. 1524.

Primary Examiner—Joseph W. Hartary
Attorney, Agent, or Firm—John H. Holcombe

[57] ABSTRACT

A system for fluid jet heads such as ink jet adapted for self-cleaning of certain clogs and purging of air from the head. The head includes a manifold communicating with at least one orifice to project a stream of fluid therefrom. Two fluid supply paths at different sides of the manifold supply pressurized fluid thereto. One of the supply paths is located at the top of the manifold and is reversible. If air or an impurity causing a nozzle clog is encountered in the head, the top path may be reversed so the fluid enters from one path and exits at the top. This establishes a crossing flow at the orifice, tending to loosen and remove the clog and purging the impurity or air from the head and out the reversible path.

9 Claims, 6 Drawing Figures

SYSTEM FOR SELF-CLEANING INK JET HEAD

BACKGROUND OF THE INVENTION

A need for high-quality, high-speed computer printers and other output printers with changeable formats has been evidenced in recent years. Developments have proceeded with respect to ink jet technology in an effort to answer this need. Many of the developments in the field of ink jet have related to pressurized ink jet systems wherein a stream or streams of ink are ejected from one or more orifices in the form of filaments and perturbated so that each filament breaks into a stream of uniformly sized droplets.

Examples of such systems include magnetic ink jet wherein droplets of magnetic ink are selectively deflected to a recording medium or to a gutter. Another example comprises electrostatic deflected ink jet such as taught by Sweet U.S. Pat. No. 3,596,275, wherein a single stream of droplets are selectively charged and passed through a uniform deflection field to impact various locations on a recording medium in accordance with the charge of each droplet. Thus, by applying suitable charging signals to the droplets, readable printed characters may be formed on the recording surface. Still another example comprises electrostatic binary ink jet such as taught by Sweet et al, U.S. Pat. No. 3,373,437. This type of system generates a plurality of jets in one or more rows, selectively charging droplets with a single charge level for deflection by a constant field to an ink drop catcher. The uncharged drops continue undeflected along the original jet path to impact the recording surface and form readable printed characters.

It appears that good print quality for printed characters requires that the lines forming character comprise more than a single row of spots resulting from the impact of ink jet droplets. Hence, the droplets required to form characters must be of an extremely small size. If the droplets are small, the spots formed therefrom may be sufficiently small and closely spaced so as to be relatively indiscernible as individual drops, but rather discernible only as part of the resultant printed symbol.

The most important factor in producing small droplets is the diameter of the orifice through which the ink is ejected. For example, to achieve a spot diameter of less than seven mils in diameter requires orifices no larger than two mils in diameter. Orifices may even reach less than one mil in diameter.

Orifices of such size are easily clogged by small particles of foreign material even though advanced filtering techniques are used.

An object of the present invention is to provide an ink jet head structure which allows cleaning of certain clogs and removal of the foreign material.

SUMMARY OF THE INVENTION

Briefly, the head structure of the invention for pressurized ink jet includes at least one orifice, a manifold communicating with the orifice, a source of pressurized fluid, and at least two flow paths for supplying the fluid from the source to the manifold, with one of the paths being reversible so as to establish a crossing flow at the orifice. Further, the reversible path may communicate with the manifold at the highest point therein to purge any air from the head.

The foregoing and other objects, features and advantages of the invention will be apparent from the following more particular description of a preferred embodiment of the invention as illustrated in the accompanying drawings.

DESCRIPTION OF THE PREFERRED EMBODIMENTS

Figure 1:
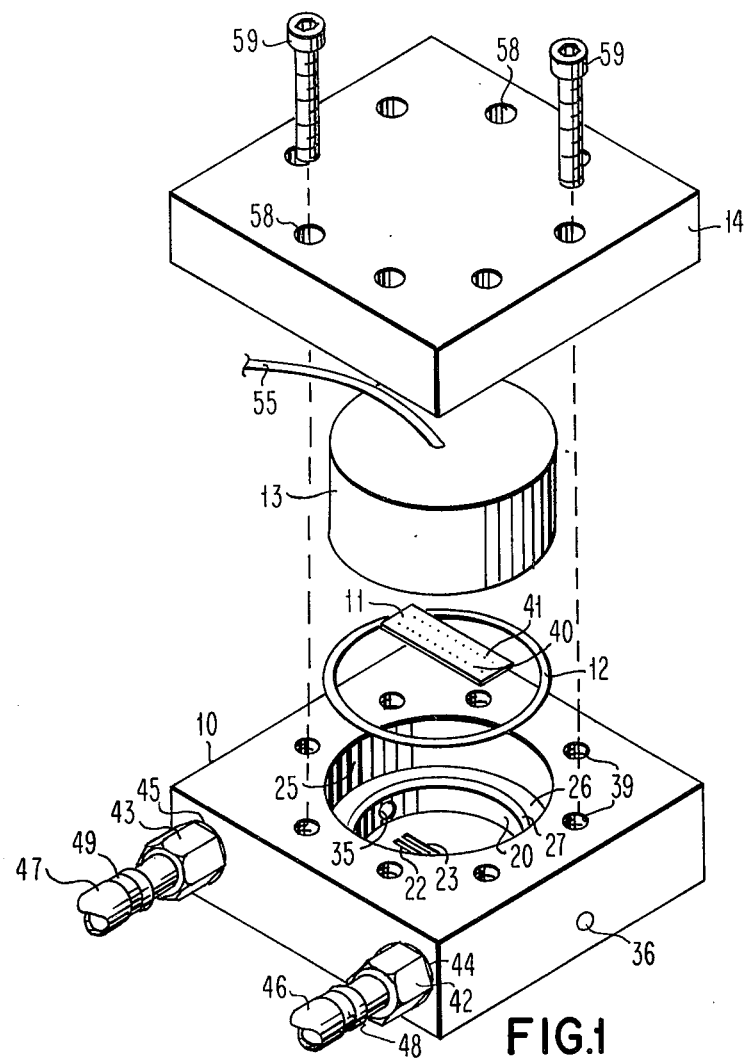
FIG. 1 is an exploded perspective view of a fluid jet head constructed in accordance with the invention.

Referring to FIG. 1, a fluid jet head assembly is shown for the generation of fluid streams which break into streams of uniform drops. Should the fluid comprise an electrostatic writing fluid, the drops may selectively be given an electrostatic charge upon breakoff and the charged drops subsequently deflected to a gutter while the uncharged drops continue towards the recording medium for selective impingement thereon in accordance with the system described in the Sweet et al patent, above. Specific charging, deflection and guttering means are described in co-pending patent application Ser. No. 543,851, Chocholaty, filed Jan. 24, 1975, entitled "High Voltage Deflection Electrode Apparatus for Ink Jet," now U.S. Pat. No. 3,955,203 assigned in common with the present application. Alternatively, the fluid may comprise a magnetic writing fluid wherein the droplets may be selectively deflected by magnetic fields.

The fluid jet head of FIG. 1 includes a cavity plate 10, a nozzle plate 11, an O-ring 12, a piezoelectric crystal driver 13 and a mounting block 14. Alternatively, in an obvious variation of the device, other kinds of driver mechanisms could be used, e.g. magnetic, electromagnetic, acoustic, etc. As will be explained, pressurized fluid supplied to the head may be perturbated by the piezoelectric crystal driver and ejected from orifices of the nozzle plate 11 to form streams of uniformly sized droplets. The orifices are of such small dimensions, e.g., 0.8 mils diameter, that very small particles of foreign material can clog a nozzle orifice. This can result either in a complete blockage of the orifice or in a partial blockage. A complete blockage prevents the flow of fluid and prevents printing from the orifice. A partial blockage changes the direction and flow of the jet, thereby disrupting the normal operation of the device.

If the foreign material is firmly wedged or lodged in the nozzle issuing the jet, the resulting clog is called a hard clog. A hard clog usually results from particles of relatively large size, usually comparable to the size of the orifice itself. Such hard clogs require a relatively large force to dislodge them.

If the foreign material is not firmly wedged or lodged in the nozzle, the resulting clog is called a soft clog. Soft clogs generally result from an accumulation of smaller particles in the nozzle, and may be more easily dislodged.

With advanced filtering of the fluid, the relative occurrence of hard clogs is considerably less. Therefore, soft clogs are the more significant as a recurring problem. Further, if not cleaned, a soft clog can result in a hard clog due to agglomeration of the foreign material or to crusting of the fluid around the orifice.

Figure 2:
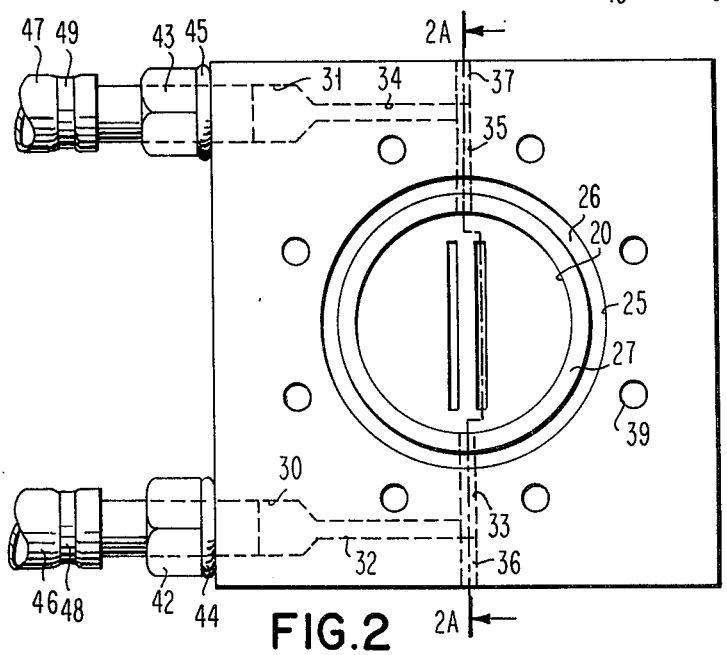
FIG. 2 is a rear view of the cavity plate of FIG. 1.
Figure 2A:
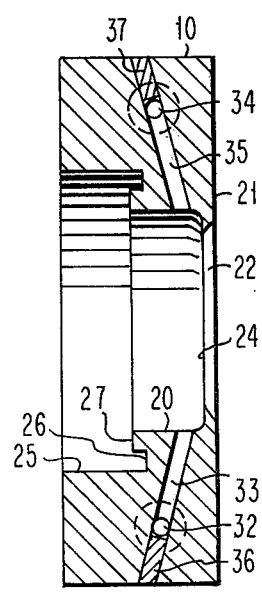
FIG. 2a is a sectional view of the cavity plate of FIG. 2.

Referring to FIGS. 1, 2 and 2A, the cavity plate 10 includes a cavity 20 cut to within a small distance from the face 21 of the plate forming wall member 24. Two parallel slots 22 and 23 are cut through the thin member 24 of the plate into the cavity 20. A second, larger cavity 25 is cut to form a space for the piezoelectric crystal driver 12. An annular groove 26 is cut below the face 27 of the second cavity 25 to form a space for the O-ring 12 to form a seal between the cavity plate 10 and the piezoelectric driver 13. Face 27 of the second cavity 25 is arranged to contact piezoelectric driver 13 and transmit vibrations of the driver to nozzle plate 11. Fluid inlets 30 and 31 are provided and connected via lines 32, 33 and 34, 35 to the cavity 20. Lines 33 and 35 may be made by drilling through the cavity plate 10 and subsequently plugging the portion of the drilled hole extending beyond lines 32 and 34 by means of plugs 36 and 37. Cavity plate 10 is provided with a number of threaded holes 39 to allow the cavity plate to be bolted to mounting block 14.

Couplers 42 and 43 are threaded into fluid inlets 30 and 31 and sealed by O-rings 44 and 45. Hoses 46 and 47 are positioned on the couplers 42 and 43 and are held by clamps 48 and 49. Pressurized fluid may thus be supplied through the hoses, couplers and lines to the cavity 20.

FIG. 1 illustrates the nozzle plate 11 formed of a thin material and having two rows 40 and 41 of small nozzle orifices extending therethrough. The nozzle plate 11 may be formed in a number of different ways, for example having a planar single crystal material with an inorganic membrane such as taught by co-pending patent application Ser. No. 537,795, Chiou et al, entitled "Ink Jet Nozzle Structure," filed Dec. 31, 1974, now U.S. Pat. No. 3,958,255 and assigned in common with the present application. Another example is co-pending patent application Ser. No. 543,600, E. Bassous et al, entitled "Ink Jet Nozzles," filed Jan. 23, 1975, to form square orifices as taught by co-pending patent application Ser. No. 537,723, Weichardt, entitled "Ink Jet Nozzle," filed Dec. 31, 1974, both of which are assigned in common with the present application. The nozzle plate 11 is then cemented to the bottom of cavity 20 such that the rows 40 and 41 are each in alignment with the corresponding slot 22 and 23.

The words nozzle, orifice and nozzle orifice are all similar in meaning, nozzle referring to a fluid outlet structure and orifice and nozzle orifice referring to the actual opening formed by the outlet structure.

Figure 3:
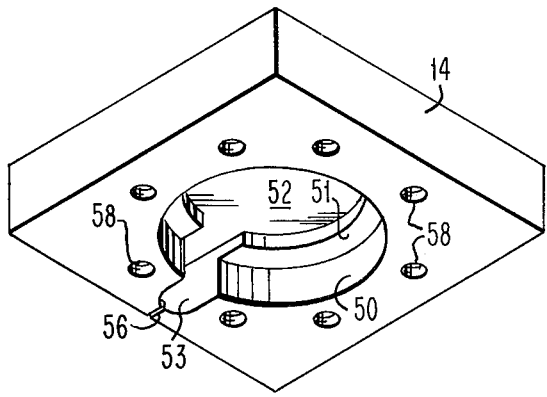
FIG. 3 is a perspective view of the mounting block of FIG. 1.

Referring to FIGS. 1 and 3, mounting block 14 is formed with a large cavity 50 having a face 51 against which the rear of the piezoelectric crystal driver 13 may firmly seal. A second smaller cavity 52 and slot 53 are provided to allow adequate clearance for wire 55 to be connected to the rear of the piezoelectric driver. A small slot 56 is supplied to allow the wire 55 to exit from the mounting block for connection to driver circuitry. Referring also to FIGS. 2 and 2A, when mounted within the assembly, piezoelectric driver 13 is thus clamped between surface 51 of backing plate 14 and O-ring 12 in notch 26 of cavity plate 10, and is maintained under slight compression. Cavity 20 is made of an electrically conductive material such that the cavity forms an electrical grounding surface contacting electrically conductive ink therein. The ink further contacts the face of the piezoelectric driver 13 so that the ink and cavity plate 10 form the grounding connection therefor. An electrical voltage applied to wire 55 thus creates a potential between the rear of driver 13 and the grounded facing thereof to thereby excite the piezoelectric driver. Lastly, mounting block 14 includes a number of countersunk holes 58 aligned with threaded holes 39 in cavity plate 10. These holes allow standard clamping screws 59 to be employed to clamp together with assembly of FIG. 1.

Figure 4:
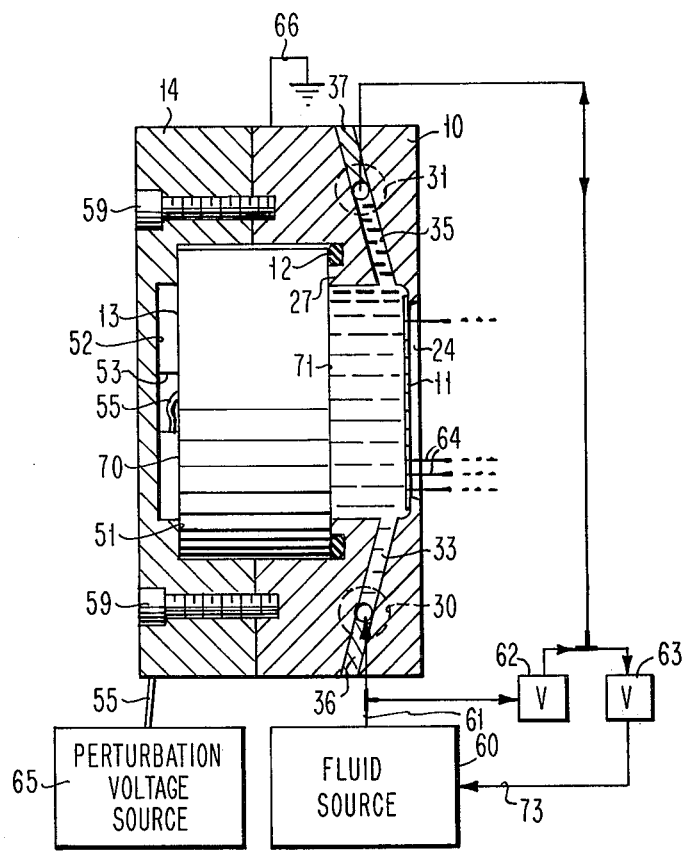
FIG. 4 is a schematic view of the assembled fluid jet head of FIG. 1 and a fluid supply system in accordance with the invention.

FIG. 4 comprises an assembled schematic view of the elements of FIG. 1. Outlet 61 of fluid source 60 is connected to input 30 and via valve 62 to input 31 of cavity plate 10 to thereby supply the fluid to cavity 20. Input 31 of cavity plate 10 is also connected to valve 63. Valves 62 and 63 may comprise solenoid operated valves. During normal operation, valve 62 is open and valve 63 is closed to supply the fluid to cavity 20 under a desired pressure. The pressure is such that a plurality of fluid jets 64 emanate from the nozzles of nozzle plate 11. A perturbation voltage source 65 is connected via wire 55 to piezoelectric crystal driver 13. The front of the piezoelectric driver 13 is in contact with the electrically conductive fluid in cavity 20 which further contacts the cavity surfaces of cavity plate 10, which is connected to ground 66. The perturbation voltage of source 65 may comprise, for example, a sine wave of 100 kilohertz frequency.

Application of the perturbation voltage from source 65 to the piezoelectric crystal driver causes the driver to tend to expand and contract between surface 70 and surface 71. The resultant vibration from the clamping of the piezoelectric driver between face 51 of mounting block and compressed O-ring 12 in notch 26 of cavity plate 10 is transmitted by the mounting block from face 51, via the screws 59 and cavity plate 10 to wall member 24 at the front of the cavity plate. Some vibration is also transmitted by compressed O-ring 12 via the cavity plate 10 to wall member 24. When vibrated in this manner, wall 24 tends to oscillate at the drive frequency of the perturbation voltage source 65 axially with respect to fluid streams 61. Also, some vibration is transmitted directly through the fluid filling the space between the driver face and the nozzle plate in cavity 20. Nozzle plate 11 is cemented to wall 24 and similarly flexes in an oscillating mode to thereby provide a velocity modulation of the fluid streams 61 in the axial direction. At the same time, the remainder of faces 70 and 71 of the piezoelectric driver remain unclamped so that the crystal may more freely expand and contract. Surface 71 of the driver is in contact with the pressurized fluid so as to form the rear wall of cavity 20. Expansion and contraction of the crystal results in surface 71 causing the contraction and expansion of the volume of the cavity 20, thereby inducing a pressure perturbation of the fluid within the cavity.

The vibration and pressure wave transmission rates are so high that within the small dimensions of the head, the velocity modulation of fluid streams 61 is in aiding phase to the pressure modulation of the fluid in cavity 20 as it exits from the orifices in nozzle plate 11. Proper modulation occurs with a peak-to-peak voltage of perturbation source 65 of approximately 5.5 volts.

Valve 63, normally closed, is connected on its output side to inlet 73 of fluid source 60. During normal operation with valve 62 open and valve 63 closed, fluid flows from outlet 61 of fluid source 60 to both input 30 and input 31 of cavity plate 10. As a variation for certain systems, inlet 73 and outlet 61 may be appropriately sized to control the ultimate pressure in the head during the jet production and the cleaning mode.

Upon occurrence of a soft clog in one or more of the nozzle orifices, valves 62 and 63 are reversed. With valve 62 thus closed and valve 63 open, the fluid from fluid source 60 now flows from outlet 61 to input 30 and line 33 of cavity plate 10, across nozzle plate 11, and outline 35 and input 31 to inlet 73 of the fluid source. The flow across nozzle plate 11 thus tends to dislodge any soft clogs from the nozzle orifices. The dislodged foreign material is then carried by the fluid out line 35 to fluid source 60. It has been found preferable to discontinue operation of perturbation voltage source 65 during the unclogging, since the pressure in the cavity is reduced because of the increased outflow of fluid through line 35 which is much larger than the accumulated opening of the orifices.

Figure 5:
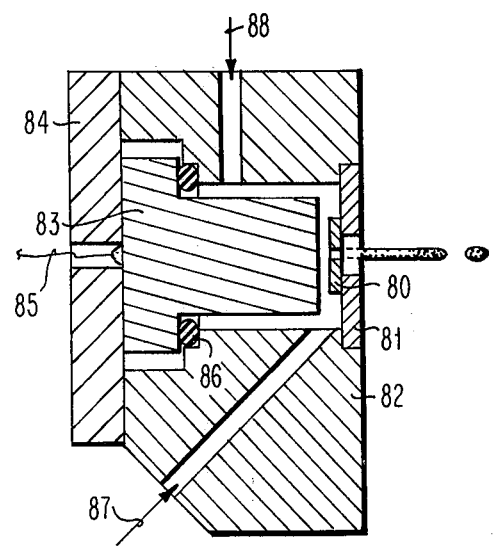
FIG. 5 is a schematic view of an alternative fluid jet head constructed in accordance with the present invention.

An alternative arrangement of an ink jet head is illustrated in FIG. 5. The head employs a single nozzle 80 and is of the type usable in the ink jet system, of the character described in the Sweet patent, above. Nozzle 80 is mounted by support 81 to body 82 of the head. A piezoelectric crystal 83 is mounted on a support 84 and connected by wire 85 to a perturbation voltage source. An O-ring 86 is employed to seal the interior of the cavity formed by body 82. Fluid is supplied by a fluid source to lines 87 and 88 to eject a fluid jet from nozzle 80. The fluid is perturbated by the piezoelectric crystal to cause the jet to break into a stream of uniform droplets.

Should nozzle 80 become wholly or partially clogged by a soft clog, the fluid flow at line 88 is reversed as discussed with respect to the embodiment of FIG. 4. This causes the fluid to flow from line 87, across nozzle 80 and out line 88, thereby tending to dislodge the clog.

Referring to both FIG. 4 and FIG. 5, by positioning the opening from the reversible line 35 or 88 at the highest point of the cavity, any air in the head will be purged from the system when the fluid flow is out that line. Absence of air is desirable since the compressible nature of air allows its presence to defeat pressure modulation of the jet by the piezoelectric crystal.

If the reversible line is not at the highest point in the cavity, air may still be purged from the head in a less efficient manner if the velocity of the fluid in the cavity is maintained at a high rate during the reversal mode.

While the invention has been particularly shown and described with reference to a preferred embodiment thereof, it will be understood by those skilled in the art that the foregoing and other changes in form and details may be made therein without departing from the spirit and scope of the invention.

What is claimed is:
1. A self-cleaning ink jet head system comprising:
a reservoir of pressurized fluid,
an orifice plate having at least one orifice therein,
a fluid dispensing manifold communicating with said fluid reservoir and with said orifice plate,
said manifold having at least two ports spaced apart,
a fluid conduit directly connected between said reservoir
of fluid and one of said manifold ports,
a fluid flow controlling valve,
another fluid conduit connected in series with said valve between the other of said manifold ports, and
said reservoir of fluid, thereby urging a flow of fluid into said manifold through both of said ports when said valve is open,
another fluid flow controlling valve, and
a further fluid conduit connected in series with said other valve between said other of said conduits as connected to said other of said manifold ports and said reservoir of fluid, thereby accepting a flow of fluid from said manifold through said other of said ports and into said reservoir when said other valve is open.

2. A self-cleaning ink jet head system as defined in claim 1, and wherein,
the first said valve is open and said second valve is closed for forcing said fluid into said manifold through both of said ports, and
the first said valve is closed and said other valve is open for flushing fluid through said manifold for purging the same.

3. A self-cleaning ink jet head system as defined in claim 2, and wherein,
the first said conduit and said other conduit are interconnected to form a common conduit portion through which the fluid flows in one direction for supplying said manifold and flows in the opposite direction for flushing said manifold.

4. A self-cleaning ink jet head system as defined in claim 1, and wherein,
said orifice is arranged between said ports and to one side thereof, whereby the opening of said other valve effects a crossing flow of fluid at said orifice tending to clear the fluid path thereat.

5. A self-cleaning ink jet head system as defined in claim 4, and wherein,
said manifold is arranged with said other port at the highest point therein, whereby operation in the flushing mode tends to purge air from the manifold.

6. A self-cleaning ink jet head system as defined in claim 4, and wherein,
said reservoir of pressurized fluid and said conduits are arranged for providing sufficient fluid pressure in said manifold as to produce a jet stream from said orifice plate and upon opening said other valve for reducing said pressure to that slightly greater than ambient pressure and lower than that required for said jet stream.

7. A self-cleaning ink jet head system as defined in claim 6, and wherein,
said reduced pressure is sufficient for purging air from the manifold.

8. A self-cleaning ink jet head system comprising:
a reservoir of pressurized fluid having at least one supply port and one return port,
an ink jet head assembly including,
a manifold having two ports spaced apart and at least one orifice arranged between said manifold ports and to one side of a line defined by said manifold ports,
a fluid conduit directly connected between said reservoir of fluid and one of said manifold ports,
another fluid conduit connected at one end to the other of said manifold ports and being bifurcated at the other end,
one fluid controlling valve connected between one of said bifurcated ends and said supply port of said reservoir, and another fluid controlling valve connected between the other of said bifurcated ends and said return port of said reservoir, thereby selectively to supply fluid to said manifold at both manifold ports and to accept fluid from the other of said manifold ports for return to said reservoir.

9. A self-cleaning ink jet head system as defined in claim 8, and wherein,
said one valve is open and said other valve is closed in a supply mode, and
said one valve is closed and said other valve is open in a flush mode.

* * * * *